United States Patent Office 2,882,258
Patented Apr. 14, 1959

2,882,258

METHOD OF MAKING COMPOSITIONS FROM VINYL AROMATIC RESINS AND RUBBERY COPOLYMERS OF STYRENE AND BUTADIENE

Roger L. Briggs, Shepherd, Mich., assignor to The Dow Chemical Company, Midland, Mich., a corporation of Delaware No Drawing. Application December 23, 1955
Serial No. 555,200

6 Claims. (Cl. 260—45.5)

This invention relates to improvements in a process for making thermoplastic compositions from resinous polymers of alkenyl aromatic hydrocarbons and rubbery copolymers of styrene and butadiene. It pertains especially to improvements in a method and agents for making such compositions having high impact strength.

U.S. Patent No. 2,623,863 makes thermoplastic compositions by a procedure wherein a major proportion of a resinous polymerized alkenyl aromatic hydrocarbon, e.g. polystyrene, a minor proportion of a rubbery elastomer such as natural or a synthetic rubber and a small amount of a liquid plasticizer having a boiling point above 200° C. are heat-plastified and mechanically worked into a uniform mass and the heat-plastified mass is thereafter kneaded or mechanically worked for a brief period of time in admixture with a very small proportion of an organic peroxide having a thermal decomposition temperature above 95° C.

The patentee teaches that the kneading or compounding of the heat-plastified mass into intimate admixture with the small amount of an organic peroxide having a thermal decomposition temperature above 95° C. results in the formation of a homogeneous composition having higher impact strength and better molding characteristics than is obtained in the absence of said peroxide. The impact strength value for the composition will vary depending upon the kind and the relative proportion of the rubbery elastomer which is incorporated with the resinous polymer, and the patentee shows that the impact strength varies with change in the viscosity characteristic of the polymer employed.

It has now been discovered that organic tertiary hydroperoxides are especially effective agents to incorporate with a heat-plastified material comprising a mixture of a thermoplastic vinyl aromatic resin and a rubbery copolymer of styrene and butadiene in proportions as hereinafter specified, which rubbery copolymer has a high gel content, e.g. a gel content corresponding to from about 70 to 95 percent by weight of the copolymer, to produce a final composition having good molding characteristics and a high impact strength.

The invention comprises a method wherein a normally solid thermoplastic vinyl aromatic resin, e.g. polystyrene, and a rubbery copolymer of from 60 to 15 percent by weight of styrene and from 40 to 85 percent of butadiene having a high gel content are heat-plastified and blended into a substantially uniform mass containing not more than 12 percent by weight of chemically combined butadiene, with or without a small amount of a liquid plasticizer, and the heat-plastified material is thereafter kneaded or mechanically worked in admixture with from 0.01 to 0.25 percent by weight of an organic tertiary hydroperoxide for a short period of time, e.g. a time of from one to 15 minutes.

It is important that the rubbery copolymer of styrene and butadiene have a high gel content, e.g. a gel content corresponding to from about 70 to 95 percent by weight of the copolymer, and that the final composition contains the rubbery copolymer in amount corresponding to not more than about 12 percent by weight of chemically combined butadiene, based on the sum of the weights of the polymeric ingredients, in order that the composition possess good molding characteristics and mechanical properties, such as being capable of forming molded or extruded articles having a smooth surface, together with good tensile strength and elongation and a high impact strength.

The method results in the formation of resinous compositions from thermoplastic vinyl aromatic resins and rubbery copolymers of styrene and butadiene, which compositions possess higher impact strength than have similar compositions prepared from the polymeric ingredients in the presence of an organic peroxy compound such as benzoyl peroxide or di-(tertiary-butyl perphthalate) under otherwise similar conditions.

The vinyl aromatic resins to be employed in preparing the compositions are the normally solid polymers, having an average molecular weight of at least 50,000 as determined by the well known Staudinger method, of one or more polymerized monovinyl aromatic hydrocarbons of the benzene series. Examples of suitable monovinyl aromatic hydrocarbons are styrene, vinyltoluene, vinylxylene, ethylvinylbenzene, isopropylstyrene or ethylvinyltoluene, etc. The resinous polymer is employed in amounts of from 70 to 97.5 percent by weight of the composition.

The resinous polymers should have an average molecular weight corresponding to a viscosity characteristic of from 15 to 80 centipoises, preferably from 20 to 60 centipoises, at 25° C. The viscosity characteristic is determined by dissolving a portion of the polymer in toluene to form a solution containing 10 percent by weight of the polymer and determining the absolute viscosity in centipoises at 25° C. of the solution.

The rubbery copolymers of styrene and butadiene to be employed in the process can be prepared in usual ways, e.g. by polymerizing a mixture of styrene and butadiene in aqueous emulsion. Rubbery copolymers containing in chemically combined form from 40 to 85 percent by weight of butadiene and from 60 to 15 percent of styrene, which copolymers have a gel content of from 70 to 95 percent by weight of the copolymer, can be employed. The gel content of the rubbery copolymer can be determined by placing a weighed portion of the copolymer in toluene at 25° C., e.g. 0.20 gram of the copolymer in 100 ml. of toluene, and allowing the mixture to stand in the dark without agitating for a period of 48 hours to dissolve the soluble portion of the copolymer, then separating the insoluble material from the solution by filtering, suitably by filtering through a 250 mesh per inch metal wire U.S. Standard screen, and drying and weighing the insoluble material. The insoluble material represents the gel content of the copolymer.

The copolymer of styrene and butadiene can be employed in proportions of from 2.5 to 30 percent by weight of the composition, which amount of the copolymer results in a final composition containing from 2 to not more than 12 percent by weight of chemically combined butadiene, based on the total weight of the polymeric ingredients. Thus, a copolymer of 40 percent by weight of butadiene and 60 percent of styrene is employed in amounts of from 5 to 30 percent by weight of the copolymer in admixture with from 95 to 70 percent by weight of a vinyl aromatic resin, e.g. polystyrene. When the rubbery copolymer contains a higher proportion of butadiene, e.g. a copolymer of 80 percent by weight of butadiene and 20 percent of styrene, the copolymer is employed in smaller amounts, i.e. in amounts of from 2.5 to 15 percent by weight of the rubbery copolymer and from 97.5 to 15 percent of the vinyl aromatic resin.

The organic tertiary hydroperoxides to be employed in the process can be represented by the formula:

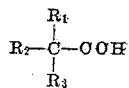

$$R_2-\underset{R_3}{\overset{R_1}{C}}-OOH$$

wherein $R_1$, $R_2$ and $R_3$ each represents a member of the group consisting of aliphatic and aromatic radicals. These radicals can be completely hydrocarbon in character, and can be of mixed character, such as alkyl, aralkyl and alkaryl, and can also have non-hydrocarbon substituents such as oxygen in the form of hydroxy or ether groups, and halogen. While alpha, alpha-dimethylbenzyl hydroperoxide (cumene hydroperoxide) is the preferred tertiary hydroperoxide, other suitable tertiary hydroperoxides are alpha, alpha-dimethyl-p-isopropylbenzyl hydroperoxide; alpha, alpha-dimethyl-p-butylbenzyl hydroperoxide; alpha, alpha-dimethyl-ar-diisopropylbenzyl hydroperoxide; alpha, alpha-dimethyl-ar-isopropylchlorobenzyl hydroperoxide; alpha, alpha-dimethyl-ar-tertiary-butyl-chlorobenzyl hydroperoxide; alpha, alpha-dimethyl-ar-methylbenzyl hydroperoxide; alpha-methyl-alpha-ethyl-ar-ethoxybenzyl hydroperoxide; alpha-alpha-dimethyl-ar-isopropyldichlorobenzyl hydroperoxide; alpha-methyl-alpha-decyl-ar-methylbenzyl hydroperoxide; alpha, alpha-diphenylbenzyl hydroperoxide; alpha, alpha-ditolybenzyl hydroperoxide; alpha, alpha-dimethyl-ar-methoxybenzyl hydroperoxide; alpha, alpha-dimethyldecyl hydroperoxide or tertiary-butyl hydroperoxide. Mixtures of any two or more of the organic tertiary hydroperoxides can be used also. The tertiary hydroperoxides can be employed in amounts corresponding to from 0.01 to 0.25, preferably from 0.05 to 0.20, percent, based on the sum of the weights of the alkenyl aromatic resin and the rubbery copolymers of styrene and butadiene employed.

The vinyl aromatic resin and the rubbery copolymer of styrene and butadiene can be blended or incorporated with one another in usual ways, e.g. by heat-plastifying the ingredients and mechanically working the same in admixture with one another on compounding rolls, in a Banbury mixer or a plastics extruder, to obtain a uniform or substantially uniform heat-plastified mass containing the polymeric ingredients in the desired proportions. The rubbery copolymer is usually employed as a free-flowing or non-tacky concentrate, i.e. as a mixture of the rubbery copolymer and a finely divided or powdered vinyl aromatic resin in amount sufficient to form a granular or powdered product free from tack. A concentrate of the rubbery copolymer can conveniently be prepared by mixing a synthetic latex of the rubbery copolymer with a latex of a vinyl aromatic resin, e.g. styrene polymerized in aqueous emulsion, and coagulating, washing and drying the polymer or by spray drying the mixture of latexes to recover the polymer. A concentrate of the rubbery copolymer in the form of small non-tacky particles can readily be blended with a heat-plastified vinyl aromatic resin, or with granules of a vinyl aromatic resin, after which the mixture is heat-plastified and mechanically worked into a uniform mass.

The heat-plastified mass is kneaded or compounded in intimate admixture with an organic tertiary hydroperoxide at temperatures between 140° and 280° C., preferably from 180° to 280° C. for a period of time of from about 1 to 15 minutes, then is cooled and cut or ground to a granular form suitable for molding.

In practice, a concentrate of the rubbery copolymer, suitably prepared by mixing a latex of the rubbery copolymer and a latex of a vinyl aromatic resin, e.g. polystyrene, together with a small amount of a stabilizer or antioxidant and a flow agent and drying the aqueous dispersion to recover the solids, is fed to a plastics extruder wherein it is heat-plastified and extruded into a stream of a heat-plastified vinyl aromatic resin in a second plastics extruder in the desired proportions. The resulting mixture is compounded or mechanically worked in the second extruder into a uniform mass and is then mixed with a stream of the organic tertiary hydroperoxide, suitably dissolved in a solvent, preferably a non-volatile organic compound which is a plasticizer for polystyrene and is liquid over a temperature range of from 70° to 230° C. or above, such as white mineral oil, sesame oil, peanut oil, soybean oil, castor oil, butyl stearate, dibutylphthalate, diisopropylbenzene, triisopropylbenzene, diisopropyltoluene, etc., also fed to the second extruder and into admixture with the heat-plastified mass of the mixed polymeric ingredients in amounts corresponding to from 0.5 to 5 percent by weight of the solvent and from 0.01 to 0.25 percent of the hydroperoxide, based on the sum of the weights of the polymeric ingredients. The final mixture is blended in intimate admixture at temperatures between 180° and 280° C. in the second extruder for a period of time, e.g. of from 1 to 15 minutes, to form a homogenous mass, then is extruded, cooled and cut to a granular form.

Other ways of incorporating the ingredients with one another to obtain a homogenous composition will be apparent to those skilled in the art. For instance, the ingredients can be incorporated with one another by compounding on heated rolls or in a Banbury mixer, but such methods have been found to be less satisfactory than a continuous method wherein the ingredients are heat-plastified and blended into a uniform composition as herein described. In all such blending operations it is important that the vinyl aromatic resin and the rubbery copolymer be blended into a uniform or substantially uniform heat-plastified mass prior to compounding said mass with the organic tertiary hydroperoxide.

The following examples illustrate ways in which the principle of the invention has been applied, but are not to be construed as limiting its scope.

EXAMPLE 1

A portion of a batch of a concentrate in the form of small particles and consisting of a uniform mixture of 75 percent by weight of a rubbery copolymer of 30 percent by weight of styrene and 70 percent of butadiene, 15 percent of emulsion polymerized polystyrene, 5 percent of 2,6-di-tertiary butyl-4-methyl phenol as stabilizer and 5 percent of polyethylene glycol having an average molecular weight of 600 as lubricant was fed continuously to a plastics extruder at a rate of 62.5 pounds of the concentrate per hour. The concentrate was heat-plastified and extruded into a stream of molten polystyrene having a viscosity characteristic of 30 centipoises (10 weight percent solution in toluene) flowing at a rate of 750 pounds per hour in a second plastics extruder wherein the heat-plastified mixture was blended at a temperature of 220° C. and was mixed with a stream of a liquid mixture consisting of 92.5 percent by weight of butyl stearate, 2.25 percent of isopropylbenzene and 5.25 percent of cumene hydroperoxide which liquid mixture was injected into the stream of the blended polymers in the second plastics extruder at a rate of 8.25 pounds per hour. The resulting mixture was blended in the second plastics extruder for a period of one minute at temperatures between 220° and 276° C., then was extruded through a die, was cooled and cut to a granular form. The product was a uniform composition. A portion of the product was injection molded to form test bars of ½ x ⅛ inch cross section. These test bars were employed to determine the tensile strength and percent elongation values for the composition employing procedures similar to those described in ASTM D638–49T. Notched impact strength was determined by procedure similar to that described in ASTM D256–47T.

For purpose of comparison, a similar composition was prepared in like manner, but without adding the isopropylbenzene and cumene hydroperoxide. The properties of this composition were determined as described above, and are reported below under the heading A. The properties for the composition prepared in admixture with the isopropylbenzene and the cumene hydroperoxide are reported under the heading B. The compositions had the properties:

|  | A | B |
|---|---|---|
| Tensile Strength_____lbs./sq. in._ | 5,250 | 4,660 |
| Elongation_____percent__ | 21.4 | 23.3 |
| Notched Impact Strength_____ft.-lbs._ | 1.4 | 2.6 |

EXAMPLE 2

In each of a series of experiments, a charge of 24 pounds of the batch of the concentrate of the rubbery copolymer of styrene and butadiene described in Example 1, was mixed with 273 pounds of granular molding grade polystyrene having a viscosity characteristic of 30 centipoises. The mixture was fed to a plastics extruder at a rate of 40 pounds per hour, wherein it was heat-plastified and blended at temperatures between 180° and 200° C., then was mixed with one percent by weight of a liquid mixture of butyl stearate containing cumene hydroperoxide in amounts corresponding to proportions based on the plastic as stated in the following table, which liquid mixture was injected into the stream of the blended plastic in the extruder. The resulting mixture was blended at temperatures between 180° and 238° C. for a period of 3 minutes in the plastics extruder, then was extruded through a die, cooled and cut to a granular form. A portion of the product was injection molded and tested employing procedures similar to those employed in Example 1. The table identifies the compositions and gives the proportions in percent by weight of the rubbery copolymer and polystyrene employed in preparing the same. The table gives the percent by weight of cumene hydroperoxide employed in each composition based on the weight of the polymeric ingredients and gives the properties determined for the composition.

Table 1

| | Starting Materials | | | Products | | |
|---|---|---|---|---|---|---|
| Run No. | Polystyrene, Percent | Copolymer of Styrene and Butadiene, Percent | Cumene Hydroperoxide, Percent | Tensile Strength, lbs./sq. in. | Elongation, Percent | Notched Impact Strength, ft.-lbs. |
| 1 | 94 | 6 | 0.035 | 4,990 | 12.4 | 1.96 |
| 2 | 94 | 6 | 0.050 | 5,180 | 18.2 | 2.19 |
| 3 | 94 | 6 | 0.065 | 4,880 | 13.0 | 2.20 |
| 4 | 94 | 6 | 0.075 | | | 2.38 |
| 5 | 94 | 6 | 0.085 | 4,940 | 18.4 | 2.08 |
| 6 | 94 | 6 | 0.10 | 5,040 | 16.6 | 2.03 |
| 7 | 94 | 6 | 0.15 | | | 1.90 |
| 8 | 94 | 6 | 0.25 | | | 1.70 |

EXAMPLE 3

A charge of 24 pounds of the batch of the concentrate of the rubbery copolymer of butadiene and styrene described in Example 1, and 276 pounds of a batch of granular molding grade polystyrene were blended. The polystyrene employed in the experiment had a viscosity characteristic of 30 centipoises (10 weight percent solution of the polystyrene in toluene at 25° C.). The mixture was fed to a plastics extruder wherein it was heat-plastified, uniformly blended and intimately incorporated with one percent by weight of butyl stearate containing tertiary butyl hydroperoxide in amount corresponding to 0.025 percent, based on the weight of the polymeric ingredients, then was extruded, cooled and cut to a granular form, employing procedure similar to that employed in Example 2. The composition contained 4.3 percent by weight of chemically combined butadiene. Molded test bars of the composition had a notched impact strength value of 2.30 ft.-lbs.

In contrast, a composition prepared from a similar rubbery copolymer of styrene and butadiene and the molding grade polystyrene, which composition was prepared in similar manner by heat-plastifying and blending the polymeric ingredients with one another and with one percent by weight of butyl stearate containing 0.05 percent of benzoyl peroxide based on the polymeric ingredients, and which final composition contained 3.74 percent by weight of chemically combined butadiene, had a notched impact strength of only 1.50 ft.-lbs.

EXAMPLE 4

A charge of 30 pounds of a copolymer of 45 percent by weight of butadiene and 55 percent of styrene, containing 2 percent by weight of 2,6-di-tertiary butyl-4-methyl phenol as stabilizer, in the form of small particles was mixed with 170 pounds of granular polystyrene containing one percent by weight of white mineral oil as lubricant and having a viscosity characteristic of 32 centipoises (10 weight percent solution of the polystyrene in toluene at 25° C.). The mixture was fed to a plastics extruder wherein it was heat-plastified, blended and intimately incorporated with 1.85 percent by weight of butyl stearate containing 0.15 percent of cumene hydroperoxide, based on the weight of the polymeric ingredients, and at temperatures between 172° and 198° C. over a period of about 2 minutes, then was extruded, cooled and cut to a granular form. The product was a uniform composition containing 93.3 percent by weight of chemically combined styrene and 6.7 percent of butadiene. The product had a notched impact strength of 3.8 ft.-lbs.

EXAMPLE 5

A concentrate of a rubbery copolymer similar to that employed in Example 1, was fed to a plastics extruder at a rate of 62.5 pounds per hour. The concentrate was heat-plastified and fed into a stream of molten polystyrene having a viscosity characteristic of 40 centipoises (10 weight percent solution of the polystyrene in toluene) at 25° C. flowing at a rate of 750 pounds per hour in a second plastics extruder wherein the mixture was blended at temperatures between 180° and 220° C., then was mixed with one percent by weight of a liquid mixture of butyl stearate containing 7.5 percent by weight of cumene hydroperoxide, also fed to the second extruder and injected into the heat-plastified and blended mixture of the polymeric ingredients. The resulting mixture was blended in the plastics extruder at temperatures between 220° and 270° C. for a period of about one minute, then was extruded through a die, cooled and cut to a granular form. The properties for the composition were determined employing procedures similar to those employed in Example 1. The product had the properties:

Tensile strength _____lbs./sq. in__ 5060
Elongation _____percent__ 14
Notched impact strength _____ft.-lbs__ 3

I claim:
1. In a method of making a thermoplastic composition containing a polymerized monovinyl aromatic hydrocarbon and a rubbery elastomer intimately incorporated with one another, wherein a normally solid alkenyl aromatic resin and a rubbery elastomer are blended by heat-plastifying and mechanically working the components into a uniform mass at elevated temperatures and said heat-plastified mass is thereafter mechanically worked in admixture with a small amount of a liquid plasticizer and an organic peroxide, the steps which consist in blending a normally solid thermoplastic vinyl aromatic resin (A) consisting of at least one polymerized monovinyl aromatic hydrocarbon of the benzene series and a rubbery copolymer (B) of from 40 to 85 percent by weight of butadiene and from 60 to 15 percent of styrene, which copolymer has a gel content corresponding to from 70 to 95 percent by weight of the copolymer, into a heat-plastified mass at temperatures between 140° and 280° C. in proportions such that the mass contains from 2 to 12 percent by weight of chemically combined butadiene, based on the sum of the weights of (A) and (B) and thereafter mechanically working said heat-plastified mass into intimate admixture with from 0.05 to 5 percent by weight of a liquid plasticizer having a boiling point above 200° C. and from 0.01 to 0.25 percent by weight of an organic tertiary hydroperoxide at temperatures between 180° and 280° C.

2. A method as claimed in claim 1, wherein the vinyl aromatic resin (A) is polystyrene.

3. A method as claimed in claim 1, wherein the hydroperoxide is tertiary butyl hydroperoxide.

4. A method as claimed in claim 1, wherein the hydroperoxide is cumene hydroperoxide.

5. A method of making a thermoplastic composition which comprises blending polystyrene having a viscosity characteristic of at least 15 centipoises at 25° C. (10 weight percent solution of the polystyrene in toluene) and a rubbery copolymer of from 40 to 85 percent by weight of butadiene and from 60 to 15 percent of styrene, which copolymer has a gel content corresponding to from 70 to 95 percent by weight of the copolymer, into a heat-plastified mass at temperatures between 140° and 280° C. in proportions such that the mass contains from 2 to 12 percent by weight of chemically combined butadiene based on the sum of the weights of the polystyrene and the rubbery copolymer of butadiene and styrene and thereafter mechanically working said heat-plastified mass into intimate admixture with from 0.5 to 5 percent by weight of butyl stearate and from 0.05 to 0.20 percent by weight of cumene hydroperoxide at temperatures between 180° and 280° C. under a pressure at least as great as that required to maintain the butyl stearate substantially in liquid condition and for a period of time of from 1 to 15 minutes.

6. A method as claimed in claim 5, wherein the polystyrene has a viscosity characteristic between 20 and 60 centipoises at 25° C.

References Cited in the file of this patent
UNITED STATES PATENTS

| | | |
|---|---|---|
| 2,606,163 | Morris et al. | Aug. 5, 1952 |
| 2,623,863 | Dieckmann | Dec. 30, 1952 |
| 2,726,226 | Werkheiser | Dec. 6, 1955 |

OTHER REFERENCES

Perry et al.: Modern Plastics, November 1947, pages 134 to 136 and 216 to 222.

Wicklatz et al.: Journal of Polymer Science, vol. VI, No. 1, January 1951, pages 45–58.